US010526216B1

(12) United States Patent
Batten et al.

(10) Patent No.: US 10,526,216 B1
(45) Date of Patent: *Jan. 7, 2020

(54) PASSIVE GREASE TRAP USING SEPARATOR TECHNOLOGY

(71) Applicant: Thermaco, Inc., Asheboro, NC (US)

(72) Inventors: William C. Batten, Asheboro, NC (US); Bruce W. Kyles, Asheboro, NC (US); Kenneth Kaie Prochnau, Asheboro, NC (US)

(73) Assignee: Thermaco, Inc., Asheboro, NC (US)

( * ) Notice: Subject to any disclaimer, the term of this patent is extended or adjusted under 35 U.S.C. 154(b) by 9 days.

This patent is subject to a terminal disclaimer.

(21) Appl. No.: 15/917,981

(22) Filed: Mar. 12, 2018

Related U.S. Application Data

(63) Continuation of application No. 15/079,616, filed on Mar. 24, 2016, now Pat. No. 9,932,247.

(Continued)

(51) Int. Cl.
*E03F 5/16* (2006.01)
*C02F 1/40* (2006.01)
(Continued)

(52) U.S. Cl.
CPC ............ *C02F 1/40* (2013.01); *B01D 17/0211* (2013.01); *B01D 17/0214* (2013.01); *B01D 21/0042* (2013.01); *B01D 21/10* (2013.01); *B01D 21/2433* (2013.01); *B01D 21/2483* (2013.01); *B65D 90/105* (2013.01); *E03F 5/16* (2013.01); *C02F 2001/007* (2013.01); *C02F 2101/32* (2013.01); *C02F 2103/32* (2013.01); *C02F 2201/002* (2013.01)

(58) Field of Classification Search
CPC .......... E03F 5/16; C02F 1/40; B01D 17/0211; B01D 17/0214; B01D 21/0042; B65D 88/76; B65D 90/105
USPC ......... 210/801, 521, 532.1, 532.2, 538, 540; 220/288, 293, 567.1
See application file for complete search history.

(56) References Cited

U.S. PATENT DOCUMENTS

| | | | |
|---|---|---|---|
| 978,889 A | 12/1910 | Imhoff | 210/532.2 |
| 1,200,951 A | 10/1916 | Kelly, Jr. | 210/540 |

(Continued)

FOREIGN PATENT DOCUMENTS

| | | | |
|---|---|---|---|
| DE | 19907840 A1 | 8/2000 | C02F 1/40 |
| WO | WO2000/66242 | 11/2000 | B01D 17/032 |

(Continued)

OTHER PUBLICATIONS

"Guide to Grease Interceptors," The Plumbing and Drainage Institute, 1998.

*Primary Examiner* — Christopher Upton
(74) *Attorney, Agent, or Firm* — MacCord Mason PLLC

(57) ABSTRACT

An apparatus and method for a grease trap for separating grease and solid waste from waste water. The grease trap includes a tank having a downwardly shaped bottom. An upwardly shaped baffle insert divides the tank into an upper chamber and a lower chamber. An outlet port near an upper part of the baffle allows waste into the upper chamber. An inlet invert in the tank receives incoming waste water, while an outlet invert removes water from the tank. A removable cover covers the tank and allows access for removal of accumulated grease and solid wastes.

23 Claims, 14 Drawing Sheets

Related U.S. Application Data

(60) Provisional application No. 62/139,070, filed on Mar. 27, 2015.

(51) Int. Cl.

| | | |
|---|---|---|
| *B01D 21/24* | (2006.01) | |
| *B01D 17/02* | (2006.01) | |
| *B01D 21/02* | (2006.01) | |
| *B01D 21/00* | (2006.01) | |
| *B65D 90/10* | (2006.01) | |
| *C02F 103/32* | (2006.01) | |
| *C02F 101/32* | (2006.01) | |
| *C02F 1/00* | (2006.01) | |

(56) References Cited

U.S. PATENT DOCUMENTS

| | | | | |
|---|---|---|---|---|
| 1,760,229 | A | 5/1930 | Arndt | |
| 2,213,458 | A | 9/1940 | Buckley | 210/6 |
| 2,226,968 | A | 12/1940 | Clerici | 210/6 |
| 2,338,971 | A | 1/1944 | Ross | 182/9 |
| 3,048,277 | A | 8/1962 | Bland | 210/523 |
| 3,224,593 | A | 12/1965 | Nebolsine | 210/519 |
| 3,433,385 | A | 3/1969 | Metivier | 220/40 |
| 3,662,918 | A | 5/1972 | Crawford et al. | 220/85 |
| 3,761,929 | A | 9/1973 | Wyatt | 149/87 |
| 4,038,186 | A | 7/1977 | Potter et al. | 210/92 |
| 4,051,024 | A | 9/1977 | Lowe et al. | 210/30 |
| 4,235,726 | A | 11/1980 | Shimko | 210/523 |
| 4,268,392 | A | 5/1981 | Hayes | 210/238 |
| 4,372,854 | A | 2/1983 | Szereday et al. | 210/242.3 |
| 4,385,986 | A | 5/1983 | Jaisinghani et al. | 210/123 |
| 4,406,789 | A | 9/1983 | Brignon | 210/519 |
| 4,451,366 | A | 5/1984 | Smission | 210/209 |
| 4,554,074 | A | 11/1985 | Broughton | 210/519 |
| 4,559,141 | A | 12/1985 | Gyulavari | 210/2.5 |
| 4,832,846 | A | 5/1989 | Gavin | 210/532.2 |
| 4,938,878 | A | 7/1990 | Hall | 210/744 |
| 4,985,148 | A | 1/1991 | Monteith | 210/138 |
| 5,021,153 | A | 6/1991 | Haws | 210/221.2 |
| 5,071,153 | A | 6/1991 | Haws | 210/221.2 |
| 5,178,754 | A | 1/1993 | Batten et al. | 210/138 |
| 5,204,000 | A | 4/1993 | Steadman et al. | 210/519 |
| 5,225,085 | A | 7/1993 | Napier et al. | 210/705 |
| 5,405,538 | A | 4/1995 | Batten | 210/744 |
| 5,431,826 | A | 7/1995 | Becker et al. | 210/242 |
| 5,453,197 | A | 9/1995 | Strefling | 210/519 |
| 5,498,331 | A | 3/1996 | Monteith | 210/170 |
| 5,505,860 | A | 4/1996 | Sager | 210/519 |
| 5,560,826 | A | 10/1996 | Szereday et al. | 210/519 |
| 5,565,101 | A | 10/1996 | Kuntz | 210/304 |
| 5,705,055 | A | 1/1998 | Holloway, Jr. et al. | 210/115 |
| 5,714,069 | A | 2/1998 | Sager | 210/519 |
| 5,718,824 | A | 2/1998 | Kannan et al. | 210/207 |
| 5,725,760 | A | 3/1998 | Monteith | 210/170 |
| 5,730,872 | A | 3/1998 | Rhodes | 210/519 |
| 5,746,911 | A | 5/1998 | Pank | 210/170 |
| 5,861,098 | A | 1/1999 | Morrison | 210/774 |
| 5,879,181 | A | 3/1999 | Okabe | 210/163 |
| 5,935,449 | A | 8/1999 | Buchler et al. | 210/742 |
| 5,946,967 | A | 9/1999 | Russell | 73/290 R |
| 5,993,646 | A | 11/1999 | Powers | 210/86 |
| 6,068,765 | A | 5/2000 | Monteith | 210/170 |
| 6,120,684 | A | 9/2000 | Kistner et al. | 210/163 |
| 6,213,002 | B1 | 4/2001 | Batten et al. | 99/340 |
| 6,238,572 | B1 | 5/2001 | Batten | 210/739 |
| 6,261,446 | B1 | 7/2001 | Cornick | 210/173 |
| 6,328,890 | B1 | 12/2001 | Thibault | 210/532.2 |
| 6,413,435 | B1 | 7/2002 | Kyles et al. | 210/800 |
| 6,475,381 | B1 | 11/2002 | Gustafsson | 210/151 |
| 6,517,715 | B1 | 2/2003 | Batten et al. | 210/232 |
| 6,619,118 | B1 | 9/2003 | Keck | 73/304 C |
| 6,637,457 | B2 | 10/2003 | Evanovich et al. | 210/153 |
| 6,645,387 | B2 | 11/2003 | Naski et al. | 210/744 |
| 6,730,222 | B1 | 5/2004 | Andoh et al. | 210/304 |
| 6,800,195 | B1 | 10/2004 | Batten et al. | 210/138 |
| 6,849,176 | B1 | 2/2005 | Batten et al. | 210/97 |
| 6,879,935 | B2 | 4/2005 | Keck | 702/168 |
| 6,951,615 | B2 | 10/2005 | Tripodi et al. | 210/744 |
| 6,951,619 | B2 | 10/2005 | Bryant | 210/788 |
| 7,075,425 | B2 | 7/2006 | Capano et al. | 340/531 |
| 7,208,080 | B2 | 4/2007 | Batten et al. | 210/86 |
| 7,296,694 | B2 | 11/2007 | Weymouth | 210/526 |
| 7,297,284 | B2 | 11/2007 | Owen et al. | 210/800 |
| 7,361,282 | B2 | 4/2008 | Smullin | 210/703 |
| 7,367,459 | B2 | 5/2008 | Batten et al. | 210/521 |
| 7,427,356 | B2 | 9/2008 | Chapin | 210/601 |
| 7,504,058 | B1 | 3/2009 | Batten et al. | 210/138 |
| 7,596,845 | B2 | 10/2009 | Batten et al. | 29/428 |
| 7,828,960 | B1 | 11/2010 | Batten et al. | 210/86 |
| 7,985,341 | B2 | 7/2011 | Pollock | 210/197 |
| 8,096,439 | B2 * | 1/2012 | Fogerlie | H02G 9/10 220/567.1 |
| 8,221,624 | B2 | 7/2012 | Dague | 210/242.3 |
| 8,262,914 | B2 | 9/2012 | Mitzlaff et al. | 210/101 |
| 8,452,459 | B2 | 5/2013 | Heavner | 700/282 |
| 8,757,287 | B2 | 6/2014 | Mak et al. | 366/129 |
| 9,932,247 | B1 * | 4/2018 | Batten | C02F 1/40 |
| 2001/0025811 | A1 | 10/2001 | Batten et al. | 210/143 |
| 2003/0136789 | A1 * | 7/2003 | Bolzer | B65D 88/76 220/567.1 |
| 2005/0178721 | A1 | 8/2005 | Lombardi, II | 210/532.2 |
| 2009/0107910 | A1 | 4/2009 | Batten et al. | 210/521 |
| 2014/0150877 | A1 | 6/2014 | Batten et al. | 17/211 |
| 2014/0214181 | A1 | 7/2014 | Ghazanfari | 700/23 |
| 2015/0122728 | A1 * | 5/2015 | Whiteside | E03F 5/16 210/519 |

FOREIGN PATENT DOCUMENTS

| | | | |
|---|---|---|---|
| WO | WO2008/124425 | 10/2008 | C02F 3/00 |
| WO | WO2013/083330 | 7/2013 | B01D 21/00 |

* cited by examiner

PASSIVE GREASE TRAP USING SEPARATOR TECHNOLOGY

This application is a continuation of U.S. application Ser. No. 15/079,616, filed Mar. 24, 2016, and is based on and claims priority to U.S. Provisional Application No. 62/139,070, filed Mar. 27, 2015, all of which are incorporated herein by reference in their entireties.

BACKGROUND

Historically, grease traps have been used in restaurants and other commercial facilities to limit the amount of grease and solid waste that is carried into sewer systems via waste water. Typical grease traps are either passive grease traps or automatic grease traps. Passive grease traps are usually emptied less regularly than automatic grease traps and therefore waste tends to build up inside the tank. Passive grease traps typically include a tank with an inlet that brings in waste water and an outlet that carries water out of the system. Lightweight grease rises to the top of the tank and heavier solids settle in the bottom of the tank.

A problem with many grease traps is that water may flush through the system with such velocity that it disrupts the grease that has already separated, causing the waste to be expelled with grey water. This is especially true as the tank fills up with grease, so that the grease/water interface is closer to the grease trap bottom. As a result, the passive tanks still have to be monitored for content levels and cleared of grease regularly in order to maintain higher grease removal efficiency. Emptying the grease from the passive traps typically has to be scheduled and can be intrusive and inconvenient for businesses. Often, the grease traps are operating at lower efficiency levels by the time the grease content is noticed and/or the traps are required to operate at capacity for longer periods of time to allow for scheduling of grease removal. Grease traps are often not easily accessible for grease removal and FOG accumulation on the trap parts can make grease removal even more difficult. Such traps can be difficult to originally position and also to repetitively access when grease removal is needed.

As such, grease traps, though effective to remove some grease and solid waste from solids containing liquids, may not adequately prevent grease from going downstream with the water and remain challenging for grease removal. Thus there remains a need for a low cost, more effective grease trap for removing solids and grease from wastewater.

SUMMARY OF THE INVENTION

The present invention fulfills one or more of these and other needs in the art by providing a grease trap for separating waste from waste water. The grease trap includes a tank having a downwardly shaped bottom. An upwardly shaped baffle insert divides the tank into an upper chamber and a lower chamber. An outlet port near an upper part of the baffle allows low specific gravity waste into the upper chamber. An inlet invert in the tank receives incoming waste water, while an outlet invert removes water from the tank. Preferably, the outlet invert includes a weep hole. In an embodiment, a cover covers the tank, and allows access to the upper chamber and into the lower chamber to suck grease and solid waste out of the tank. The grease trap may include a vent for venting gases.

In an embodiment, the tank is roto-molded plastic. Preferably, the baffle is positioned above an inlet invert opening and an outlet invert opening, and the baffle and the downwardly shaped bottom of the outer tank diverge so waste water entering the lower chambers encounters an enlarging volume. In one example, the tank may be an increased capacity tank. In another example the tank may have a length and a width. In one example, the tank length may be greater than the tank width. A baffle insert may extend the length of an increased capacity tank.

In an embodiment, the grease trap may include a support base for installing the grease trap on a floor. The support base is sized and configured to receive the downwardly shaped bottom of the tank. The support base includes support rods extending upwardly from the base for supporting the tank.

The disclosure also provides a method of separating lightweight grease and heavy solids from waste water. The method includes assembling a grease trap having an internal baffle for creating two chambers, and passing waste water through the grease tank. The method may also include pumping out lightweight grease and heavy solids from the two chambers.

In an embodiment, the method includes molding a tank unitary with an inlet invert, an outlet invert, and downwardly shaped bottom. The method also includes inserting a baffle having an upwardly shaped bottom and an outlet port. The baffle may be a removable insert.

In one embodiment, the method includes the steps of molding a tank having a downwardly shaped bottom, installing an inlet invert and an outlet invert in the outer tank, and molding an upwardly shaped baffle insert having a central hole configured for insertion in the tank and around the inlet invert and outlet invert of the outer tank. The method includes inserting the upwardly shaped baffle inside the tank to define an upper chamber above the baffle and a lower chamber below the baffle. In some embodiments, the baffle may include a series of passage ways.

In another embodiment, a method of separating lightweight grease and heavy solids from wastewater includes supplying the wastewater into a grease trap through an inlet invert opening into a lower chamber, and allowing grey water to exit the grease trap through an outlet invert, thereby establishing at least intermittent currents from the inlet invert to the outlet invert. The method may include allowing grease in the waste water to rise by gravity from the lower chamber through a hole in a baffle insert and into an upper chamber so the grease is sequestered in the upper chamber and protected from entrainment in currents of grey water, and allowing heavy solids in the waste water to fall by gravity to a sump in the lower chamber. Finally, the method may include removing collected grease and heavy solids from the grease trap.

One of skill in the art may recognize in one embodiment a method of making a grease trap including molding a tank having a downwardly shaped bottom; molding an upwardly shaped baffle insert having a hole and passage ways; installing an inlet invert and an outlet invert in the tank; and inserting the upwardly shaped baffle inside the tank to define an upper chamber above the baffle and a lower chamber below the baffle.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

The invention will be better understood by a reading of the Detailed Description of the Examples of the Invention along with a review of the drawings, in which.

DETAILED DESCRIPTION OF EXAMPLES OF THE INVENTION

Figure 1:
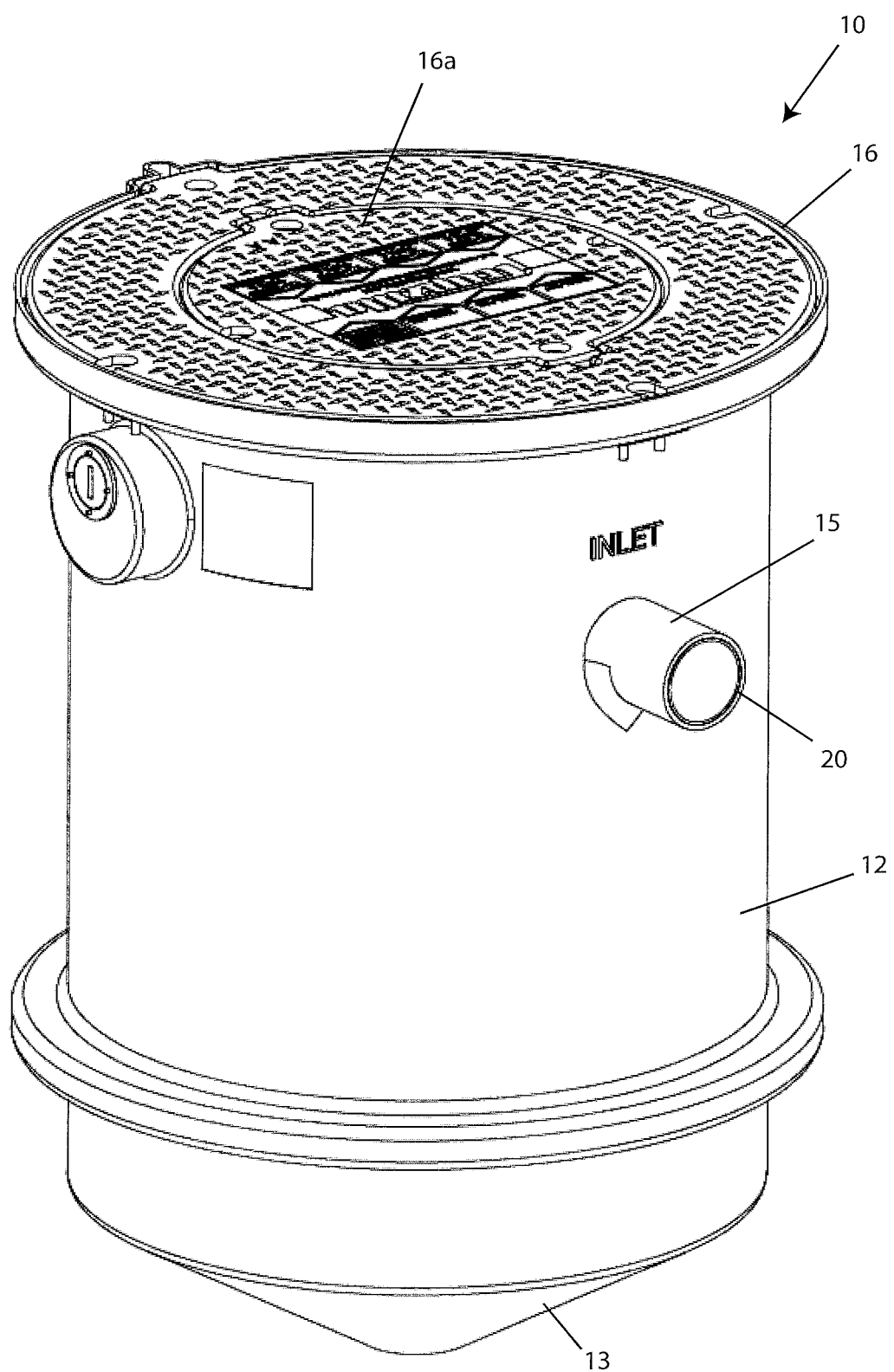
FIG. 1 is a perspective view of a grease trap constructed according to an example embodiment of the invention.

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 2:
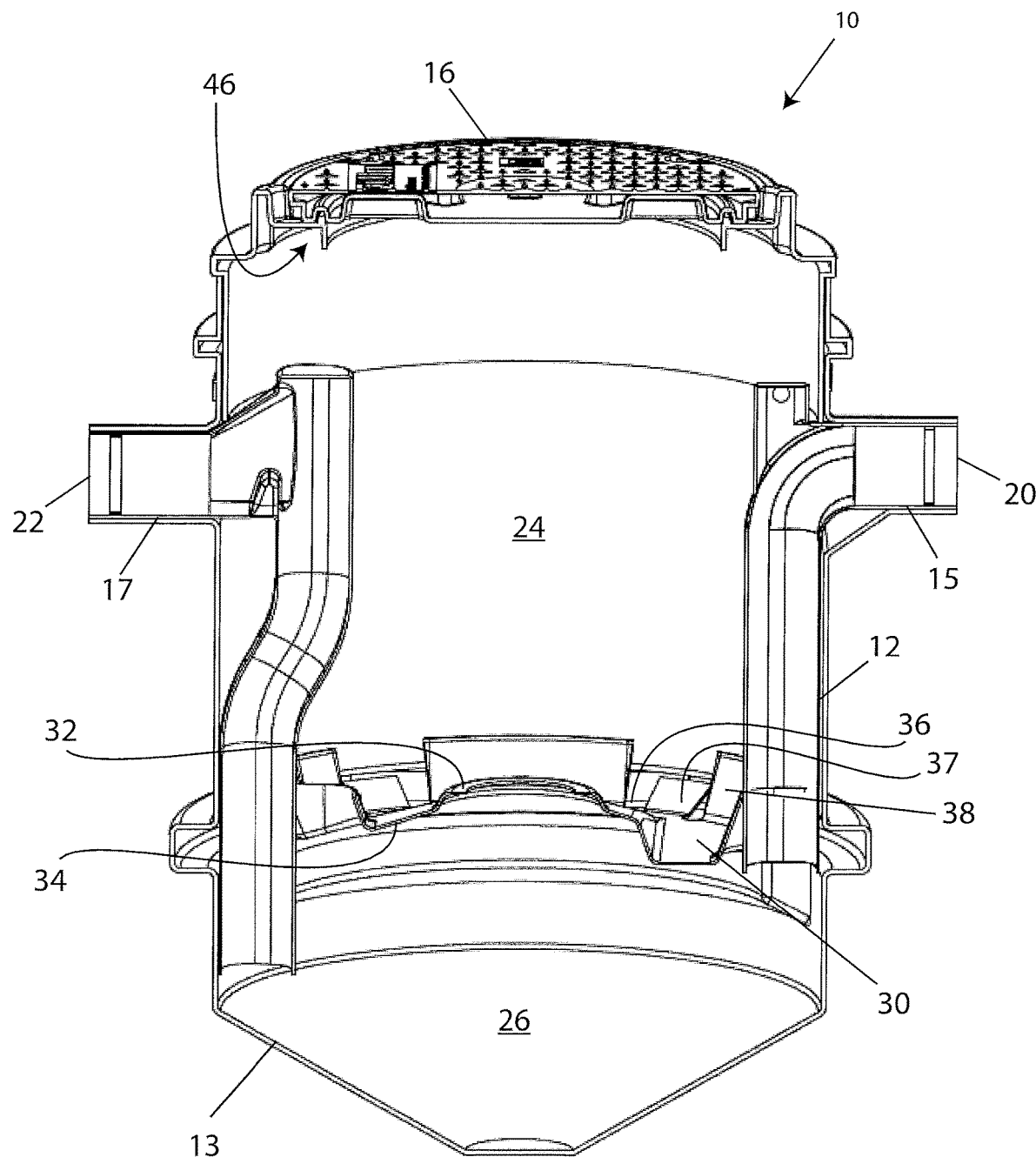
FIG. 2 is a cut away view of the grease trap constructed according to an example embodiment of the invention.

Referring now to the drawings in general and FIGS. 1 and 2 in particular, it will be understood that the illustrations are for the purpose of describing embodiments of the disclosure and are not intended to limit the disclosure or any invention thereto.

FIGS. 1 and 2 show a grease trap 10 for separating solids and grease from waste water. The grease trap 10 includes a tank 12 with a downwardly shaped bottom 13. In this embodiment, the downwardly shaped bottom is shaped like an inverted pyramid, but other shapes such as a conical shape, bowl shape, slanted plane, or the like, can be used. Preferably, the lowermost portion is centrally located, but that is not critical. An inlet connection 15 and an outlet connection 17 are provided for connecting to a waste water source/effluent waste system. An inlet invert 20 and outlet invert 22 extend into the tank 12 and direct the effluent flow into and out of the tank.

The grease trap 10 also includes a tank cover 16. The tank cover 16 is typically removable and may be one piece or may also include additional components, such as cover port 16a. Cover port 16a may be removable separately from tank cover 16. When the tank cover 16, or cover port 16a is removed, access is provided to the tank through which solids and grease may be sucked out of the grease tank 10. Other outlet ports may be provided to vent gases, selectively remove heavy solids from the downwardly shaped bottom 13 of the tank 12, or selectively remove grease trapped in any tank chambers.

A baffle 30 divides the tank into an upper chamber 24 and a lower chamber 26. The baffle 30 may include an outlet port 32 for allowing waste to travel from the lower chamber 26 into the upper chamber 24. In one embodiment, the bottom of the baffle 30 may have an upwardly shaped portion 34 so that the baffle 30 and the downwardly shaped bottom 13 of the tank 12 diverge. The upwardly shaped bottom 34 of baffle 30 may divide the tank 12 into the upper chamber 24 where lightweight grease collects, and the lower chamber 26 where heavy solids may settle.

In use, the diverging upwardly shaped bottom 34 and the downwardly shaped bottom 13, aid in the separation of grease and solid waste from water and prevents thermal inversion, where the overhead, separated grease layer is pulled downward as incoming water flow enters the grease trap. As water, oil, and grease flow into the tank 12, the water is directed through the inlet invert 20 to below the baffle so that the velocity slows to its slowest point at the position of greatest separation between the upwardly shaped bottom 34 and the downwardly shaped bottom 13. This is where the cross-sectional area that the water current encounters is the greatest. This concept of increasing residence time and enabling greater separation by a greater cross-section is disclosed in U.S. Pat. No. 6,238,572 to Batten, the entire disclosure of which is hereby incorporated by reference. The slower the velocity of the fluid, the greater the probability that the lightweight grease can separate from the water and rise to the apex of the upwardly shaped bottom at the outlet port 32 and eventually through the outlet port 32 in the upwardly shaped bottom 34 of the baffle. After passing the position of greatest divergence, the velocity can increase as the fluid makes its way from the center to the outlet invert 22.

In some embodiments, the baffle 30 may be an insert. In some examples, the baffle 30 may include a series of passage ways 36 around the peripheral of the baffle 30, such that waste may pass from the lower chamber 26 to the upper chamber 24 through the passage ways 36. In this embodiment, grease that does not travel along the upwardly shaped bottom 34, or in embodiments, not having an upwardly shaped bottom to the baffle 30, grease may still freely travel from the lower chamber 26 to the upper chamber 24. In some instances, an upwardly shaped bottom may not be preferred. In other examples, the passage ways 36 assist in preventing the build-up of grease around the outer circumference of the baffle. The baffle insert may be removable from the tank 12. The baffle insert 30 being removable makes upkeep, maintenance, repair and grease extraction in difficult situations easier to manage.

The baffle 30 may, in other examples, include a set of upward turned baffle guides 38 around the peripheral of the baffle. The baffle 30 may also include at least one stabilizer projection 37 positioning the baffle in the tank 12 below the inlet 15 and outlet 17 but above the downwardly shaped bottom 13. The stabilizer projections 37 assist in positioning and securing of the baffle for ease of removal and reentry into the tank once the tank is already installed. Previously, removal of a baffle would have been challenging due to the structures of conventional baffles and due to the accumulation of fats, oils and grease within the tank, making it difficult to properly reposition a baffle, even if one had been removed and attempted to be replaced.

Preferably, the tank 12 and/or baffle 30 is roto-molded plastic. In some cases, the inlet invert, outlet invert, and tank may be molded as one piece. However, the tank 12 may be made of metal or other materials, and the parts may be welded together or joined by other fasteners.

In a cylindrical embodiment, the inlet invert may include a vent for venting gases from the incoming flow. A vent may also be hooked up from an external port on tank 12 to an external ventilation system to prevent odors from escaping the grease tank 12 into interior areas if the grease trap is installed in a building. In the cylindrical embodiment, the tank may be stronger than in a rectangular shape, but it is contemplated to be within the scope of this disclosure for the grease tank to also be square, rectangular, or other shapes.

Figure 3:
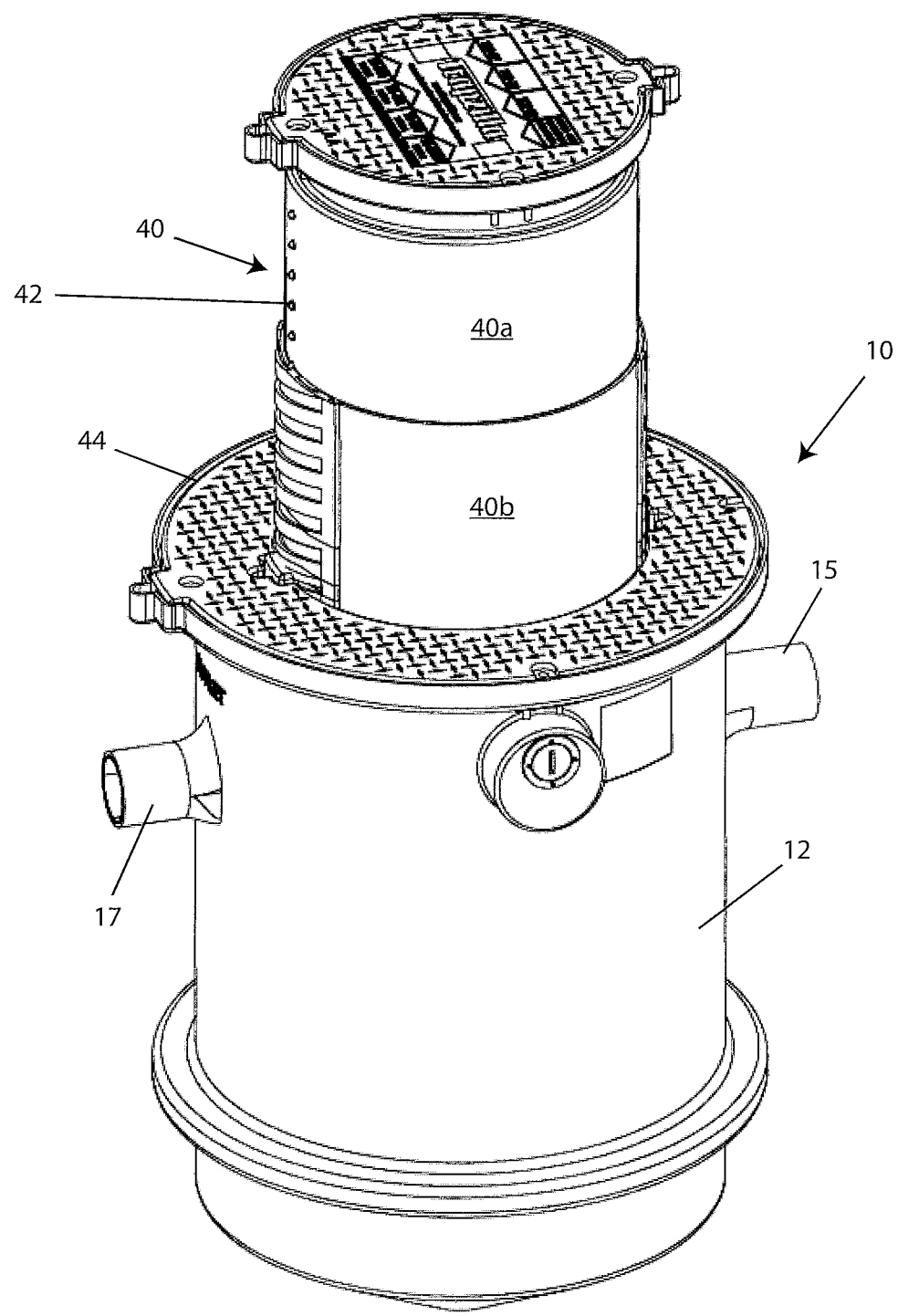
FIG. 3 is an example of an extension collar of the grease trap constructed according to an example of an embodiment of the invention.
Figure 4:
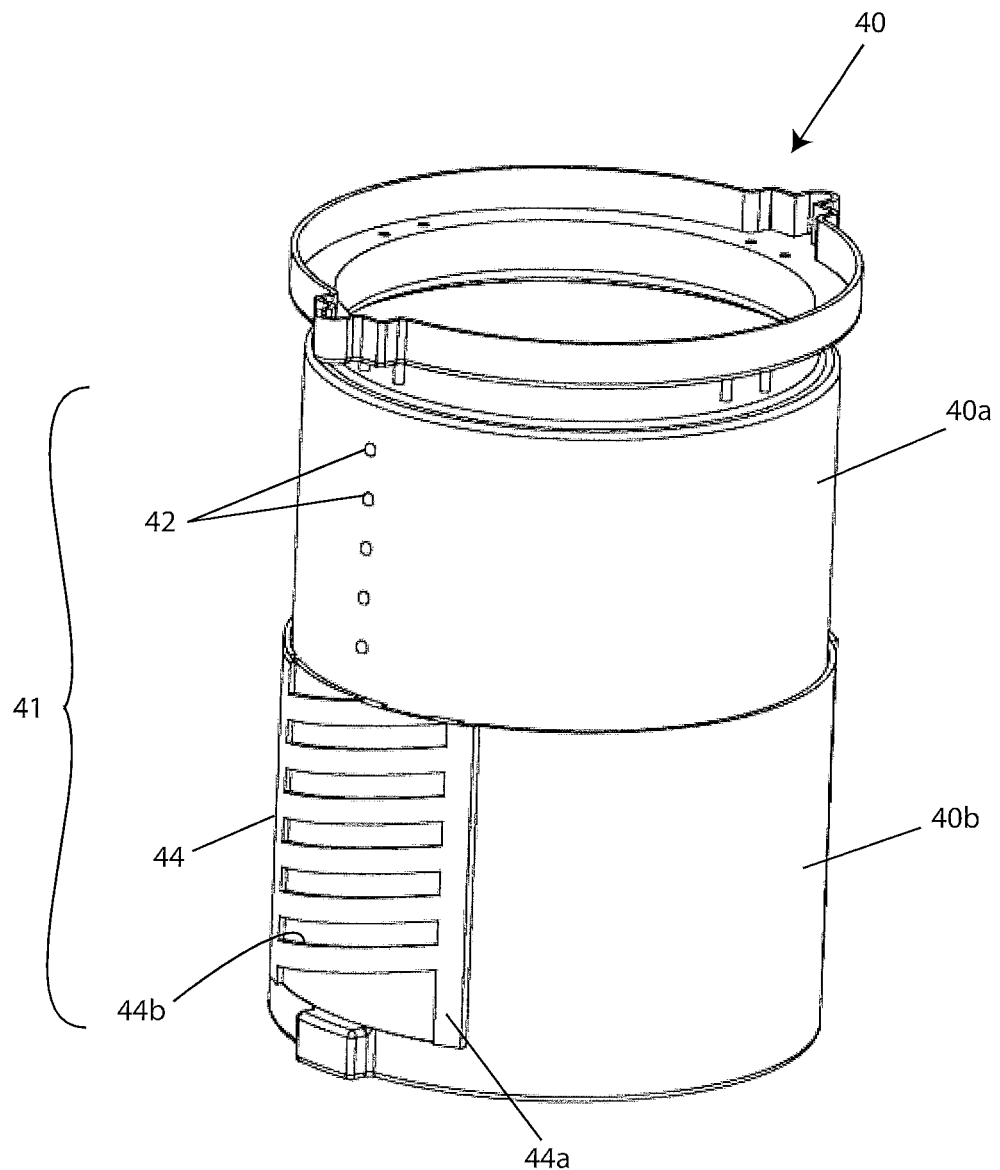
FIG. 4 is another example of an extension collar of the grease trap constructed according to an embodiment of the invention.
Figure 5:
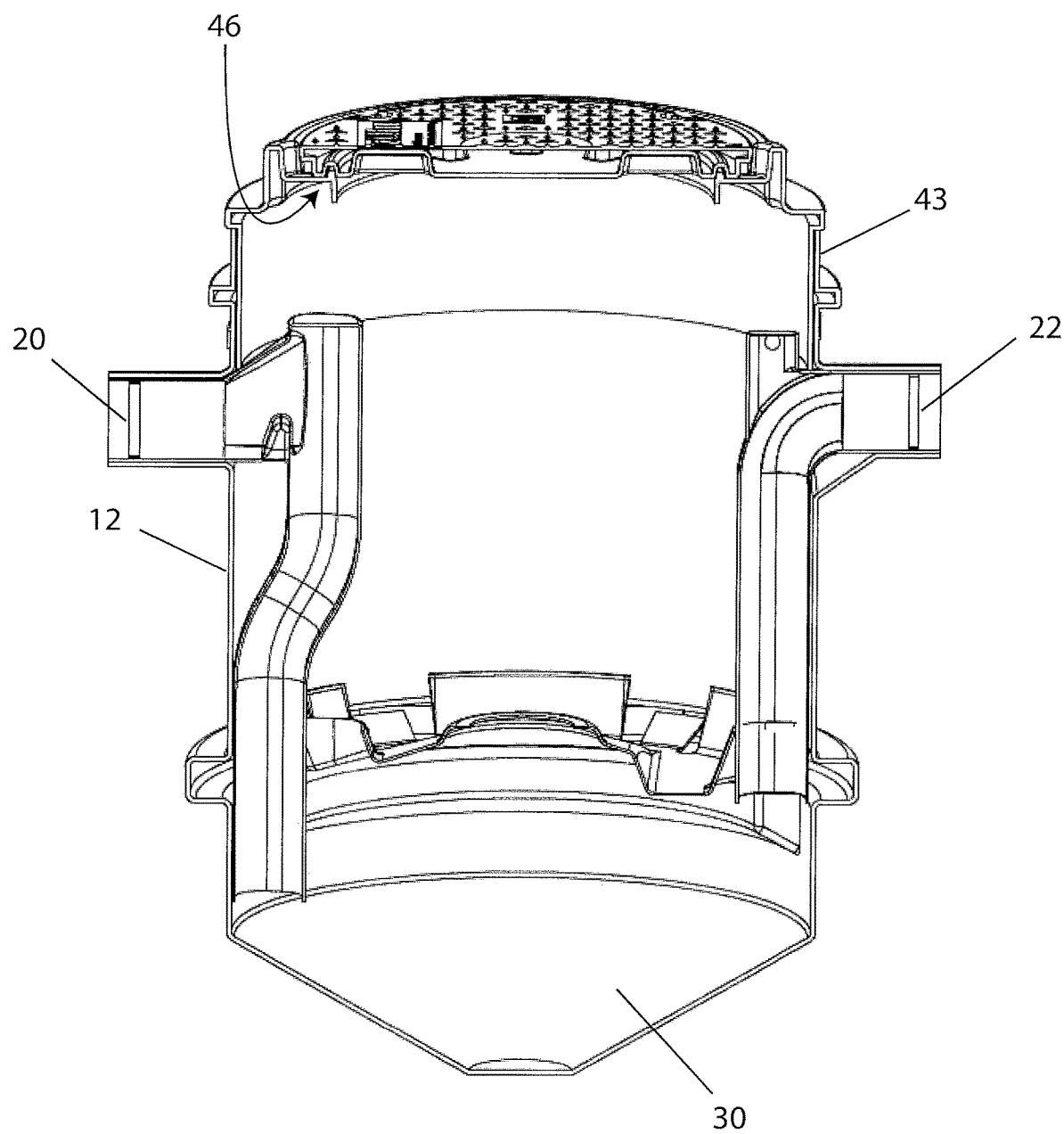
FIG. 5 is a cut away view of the interior of the grease trap constructed according to an embodiment of the invention.
Figure 6:
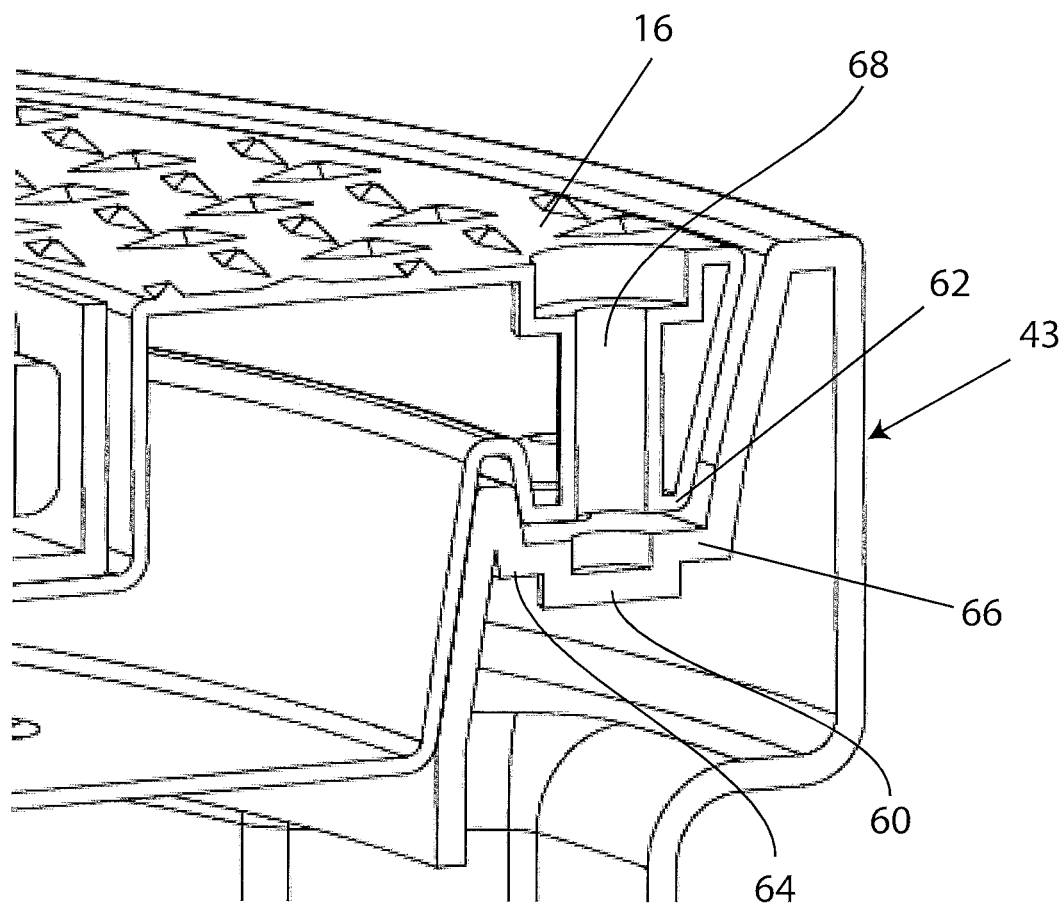
FIG. 6 is a cross-sectional view of one example of a tongue and groove covering system constructed according to an embodiment of the invention.

FIGS. 3 and 4 show examples of the grease trap 10 including an extension collar 40 for extending the cover 16 and/or cover port 16a above a portion of the top of the tank. The extension collar may be one piece. The extension collar may be more than one piece fitted together. The extension collar 40 may include a twist ladder system 42 for incrementally extending the cover above a portion of the top of the tank 12. The extension collar is typically used with in-ground and/or in-floor grease trap installations and often assists in lining up facility drainage piping when the piping is pre-installed and/or located deep below ground. In some examples, the extension collar may be a built-in extension to the tank 43. In other examples, the extension collar may be an add-on extension piece. The extension collar may be of any size to accommodate the distance from the desired position for the tank cover to the top of the grease trap 10. In some embodiments, an extension collar may be adjustable, by way of example, between a height of 10 to 17 inches and/or 17 to 31 inches. The extension collar 40 may be sizable and trimmed to adjust to small collar height needs. Additional extension collars may be joined to accommodate taller collar height needs. Silicone sealant may be used to seal joints between collars when multiple collars are joined and/or collars secured, for example, by fasteners, such as screws or bolts. The extension collar 40 may have an upper section 40a and a lower section 40b.

The twist ladder system 41 may include a section of the extension collar 40 having protrusions 42 and a section having a track 44. Generally, the protrusions are located on upper section 40a and the track 44 is located on the lower section 40b. The track 44 may include a vertical track 44a and a screw thread track 44b. The protrusions 42 may be aligned with the vertical tracks 44a. The upper section 40a and lower section 40b may be pushed together to overlap when the protrusions 42 are aligned with the vertical track 44a. By way of example, the upper section 40a may be twisted inside of the lower section 40b so that the protrusions 42 engage with the screw thread track 44b. The twisting motion may be continued causing the upper section 40a to rise or drop until the final, desired height is attained.

In some embodiments, the grease trap may include a tongue and groove covering system 46 for securing and sealing the cover 16 to the top of the tank 10. The tongue and groove covering system may also be included with cover port 16a for securing cover port 16a to the top of the tank or to an extension collar 40 raising the collar above the top of the tank 12. The tongue and groove covering system may provide an improved seal for the tank 10. The tongue and groove covering system may include a recessed portion on the tank 60 for mating with a projection 62 on the cover 16. The recessed portion 60 may be between and/or formed by an inner raised portion of the tank 64 and an outer raised portion of the tank 66. The covering 16, 16a may include a securing slot 68. The securing slot 68 may accept, by way of example, a bolt. The securing slot may extend into and through the recessed portion of the tank 60 and be secured by a fastener, such as, by way of example, a nut.

Figure 7:
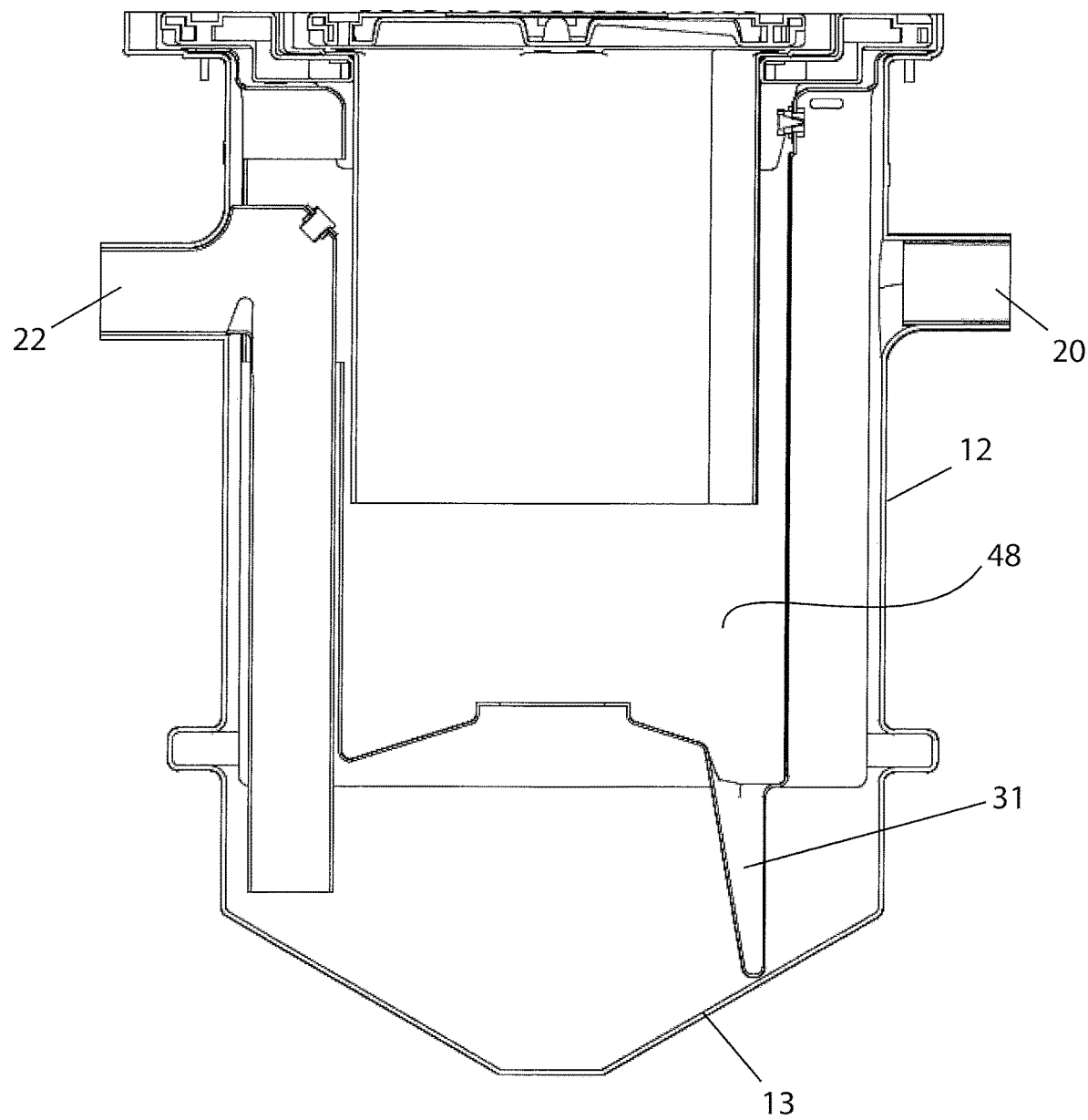
FIG. 7 is a view of the interior of one example of the grease trap showing an interior liner.

The grease trap 10 may include an internal liner 48 inside the tank 12, as seen in FIG. 7. In some examples, the trap 10 may include a vertical baffle 31. Vertical baffle 31 may be incorporated into or attached to the liner 48. Vertical baffle 31 may be a part of or attached to baffle 30.

Figure 8:
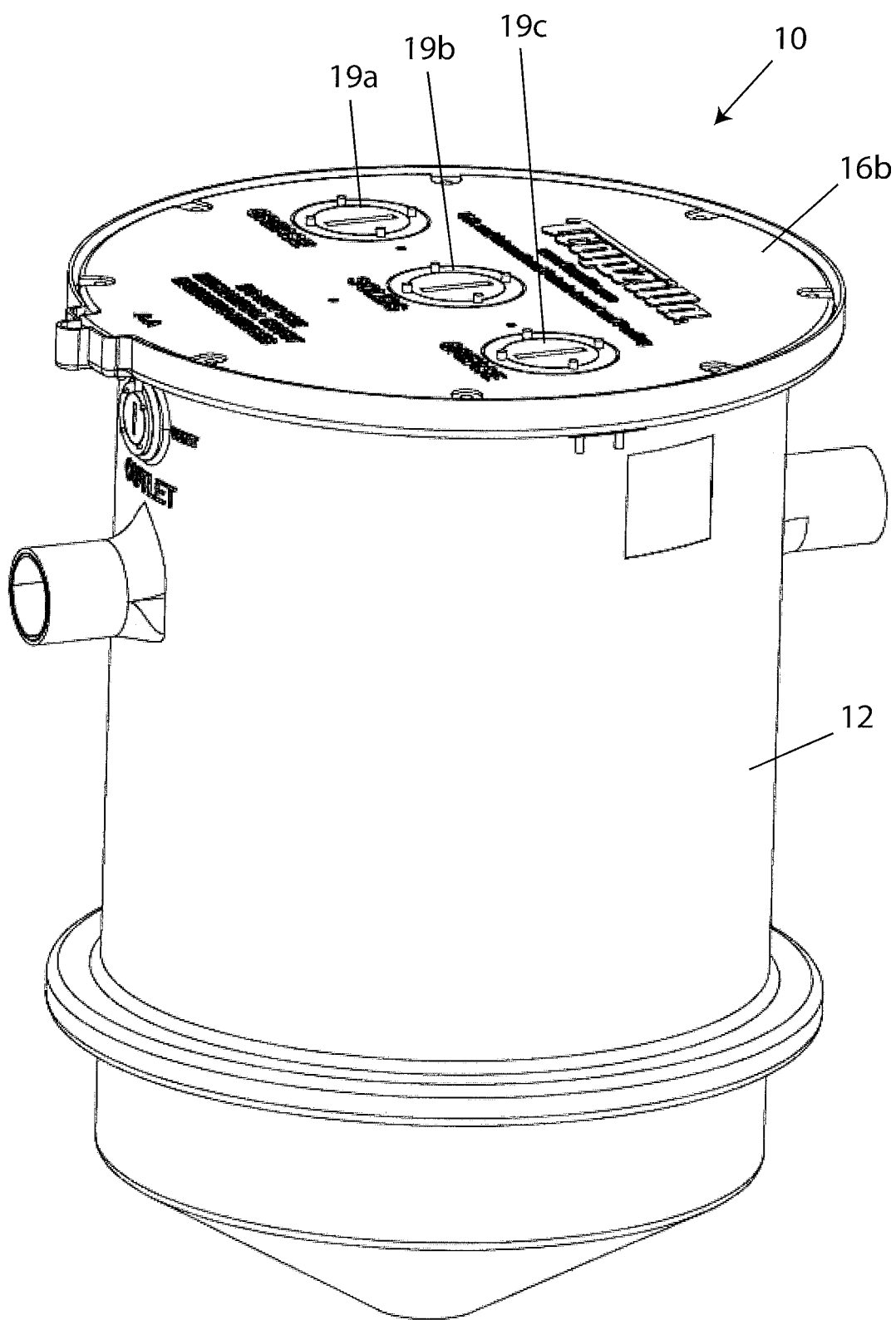
FIG. 8 is a perspective view of one example of a grease trap showing a multiport cover according to an embodiment of the invention.

FIG. 8 shows a grease trap 10 including a multiport cover 16b. The multiple ports of cover 16b allow for extraction of grease and/or solids from the multiple port locations 19a, 19b, 19c. The multiport access provides more than one entry point in cases where one port becomes blocked or is not accessible. The multiport access also provides multiple entry points for accessing the trap for different reasons, such as for solids suction versus removal of grease. The multiport cover 16b includes more than one port 19, and may contain any number of additional ports 19.

Figure 9:
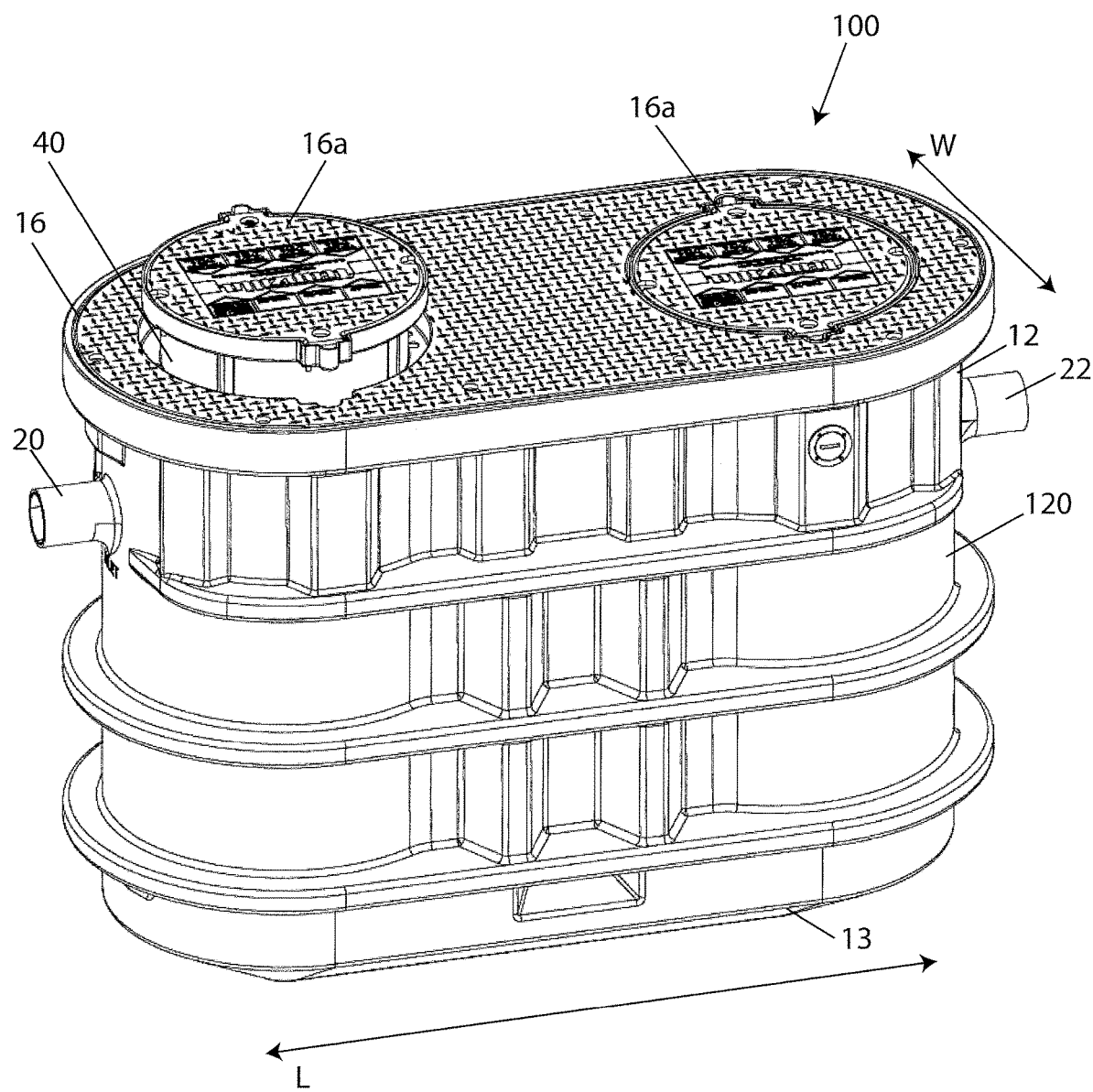
FIGS. 9 and 10 are examples of a larger capacity grease tank according to an embodiment of the invention.
Figure 10:
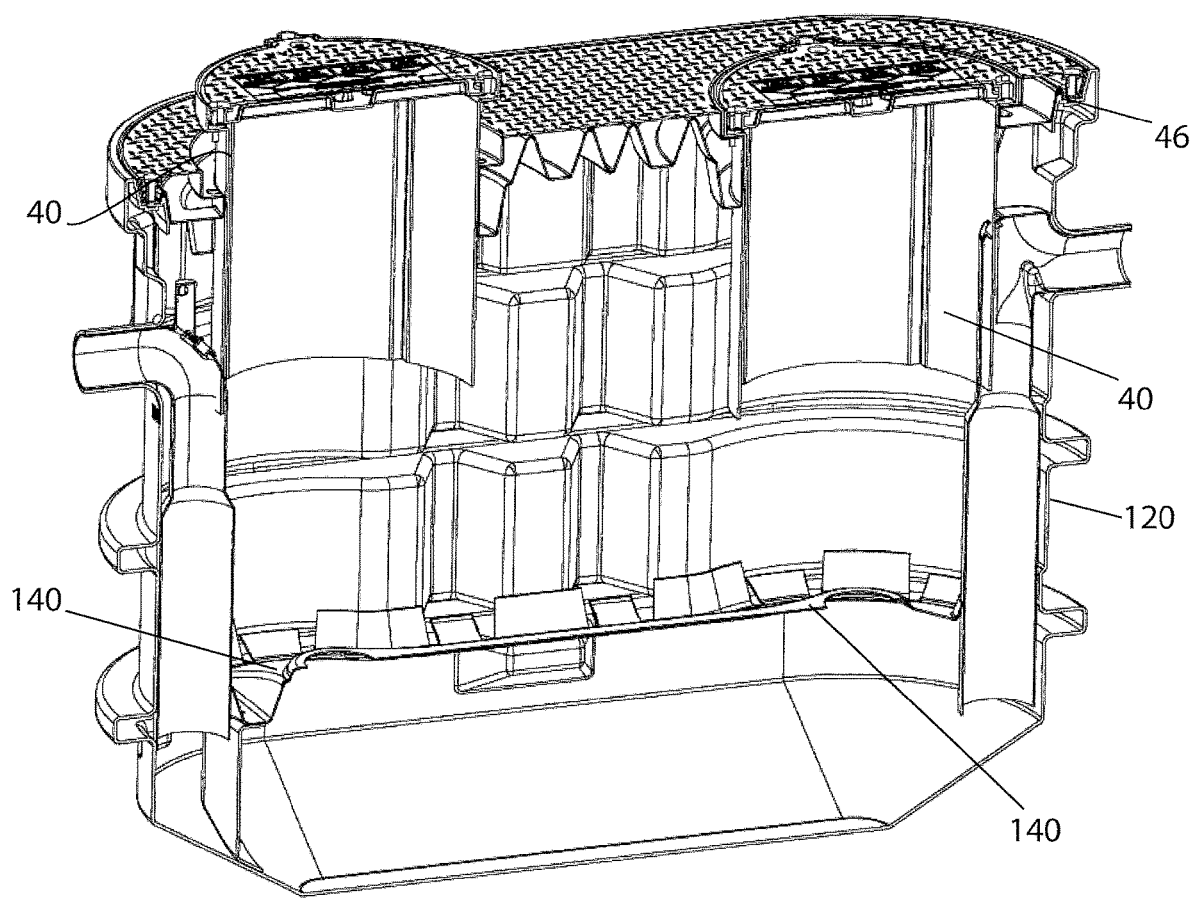
Figure 11:
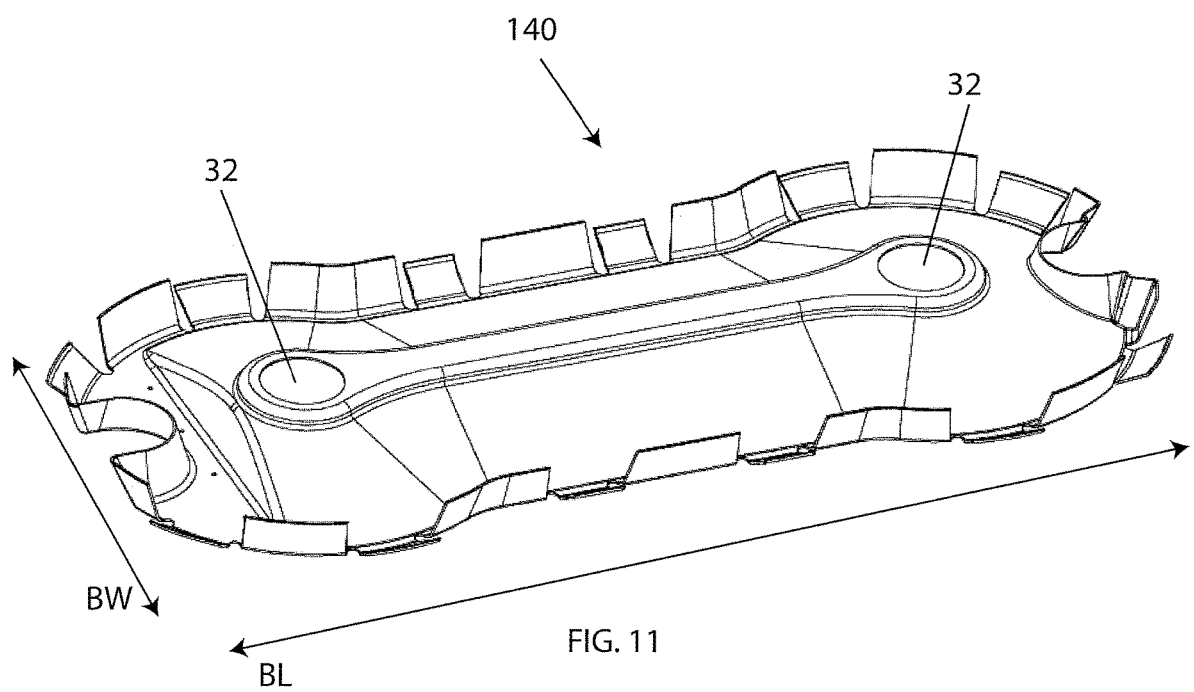
FIG. 11 is a perspective view of a baffle insert according to an embodiment of the invention.

In some embodiments, as shown in FIGS. 9, 10 and 11, the grease trap 100 may include an increased capacity tank 120. The increased capacity tank 120 allows for increased storage of grease, thus increasing the time between needed grease extractions. In one example, the tank 120 may have a length L between the inlet invert and the outlet invert and a width W, where the length L is greater than the width W. The tank 120 may include more than one extension collars 40. The tank 120 may also include more than one cover port 16a. The tank may also include an extended horizontal baffle 140 that may contain many of the same structural elements as baffle 30, previously described. Additionally, baffle 140 may include multiple outlet ports 32. Baffle 140 may have a baffle length (BL) and may run the length L of tank 120. Baffle 140 may have a baffle width (BW). The BL may be greater than the BW. The BL may be double or more the BW. In most embodiments, tank 120 and baffle 140 operate essentially in the same manner as tank 12 and baffle 30.

Figure 12:
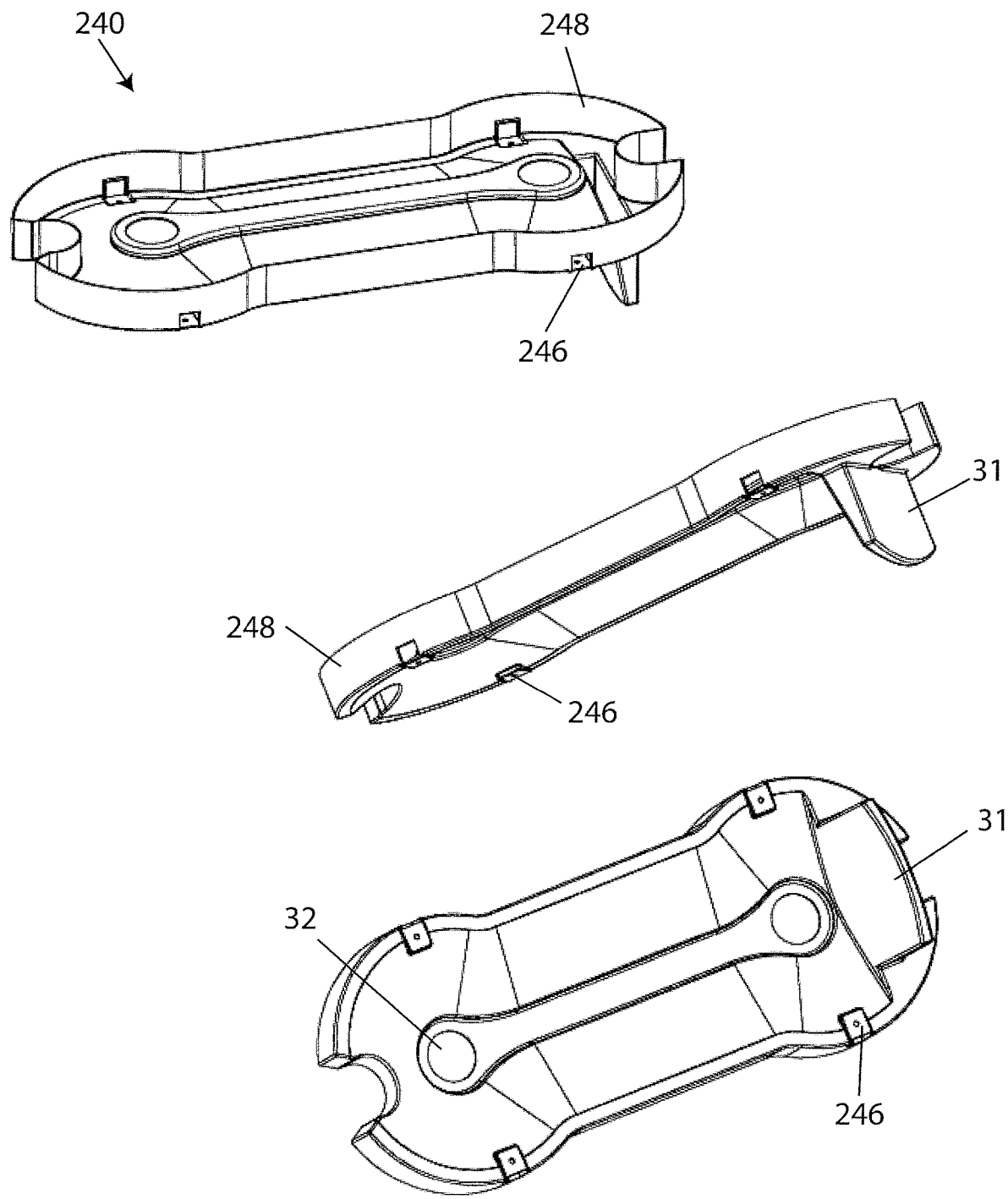
FIG. 12 is a perspective view of another example of a baffle according to an embodiment of the invention.

FIG. 12 shows, in another example, baffle 240. Baffle 240 may be an extended, horizontal baffle with many of the same structural elements as baffle 140. Baffle 240 may have sides 248. The sides 248 may be upwardly turned. The sides 248 may define a baffle length BL and/or a baffle width BW that is less that the length L and/or the width W of the tank 120. The baffle 240 may be smaller in areas than the tank 120, such that a space 244 is defined between the baffle 240 and the tank 120 around the perimeter of the baffle 240. The space 244 may be adapted to allow the flow of grease through the space. The baffle 240 may include a vertical baffle 31. Vertical baffle 31 may extend down from a bottom of baffle 31 on the inlet side of the tank 120. Brackets 242 may be included to secure the baffle 240 in place within the tank 120. Baffle 240 may include bracket slots 246 for receiving the brackets 242.

Figure 13:
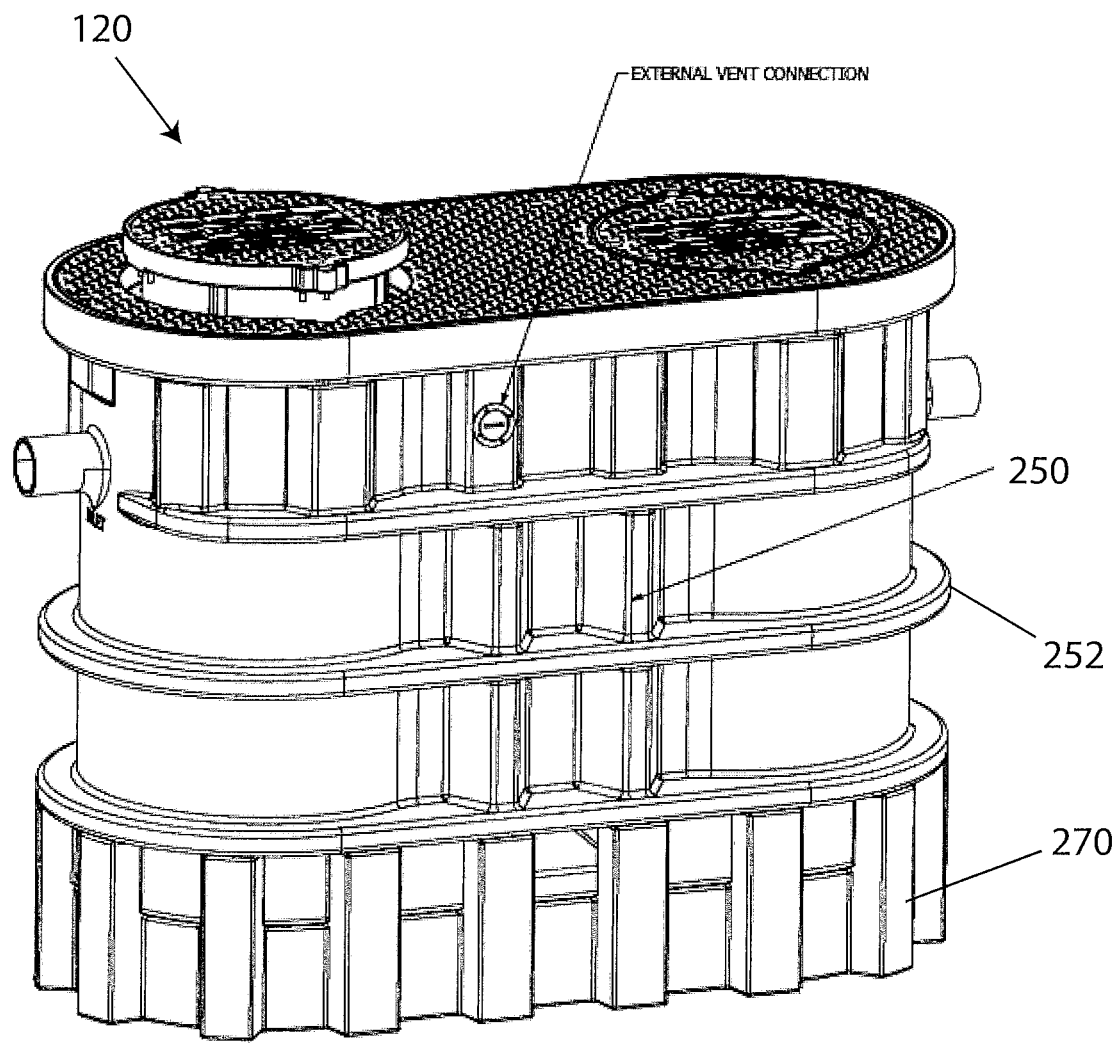
FIG. 13 is a perspective view of one example of a tank and a tank stand according to one embodiment of the invention.
Figure 14:
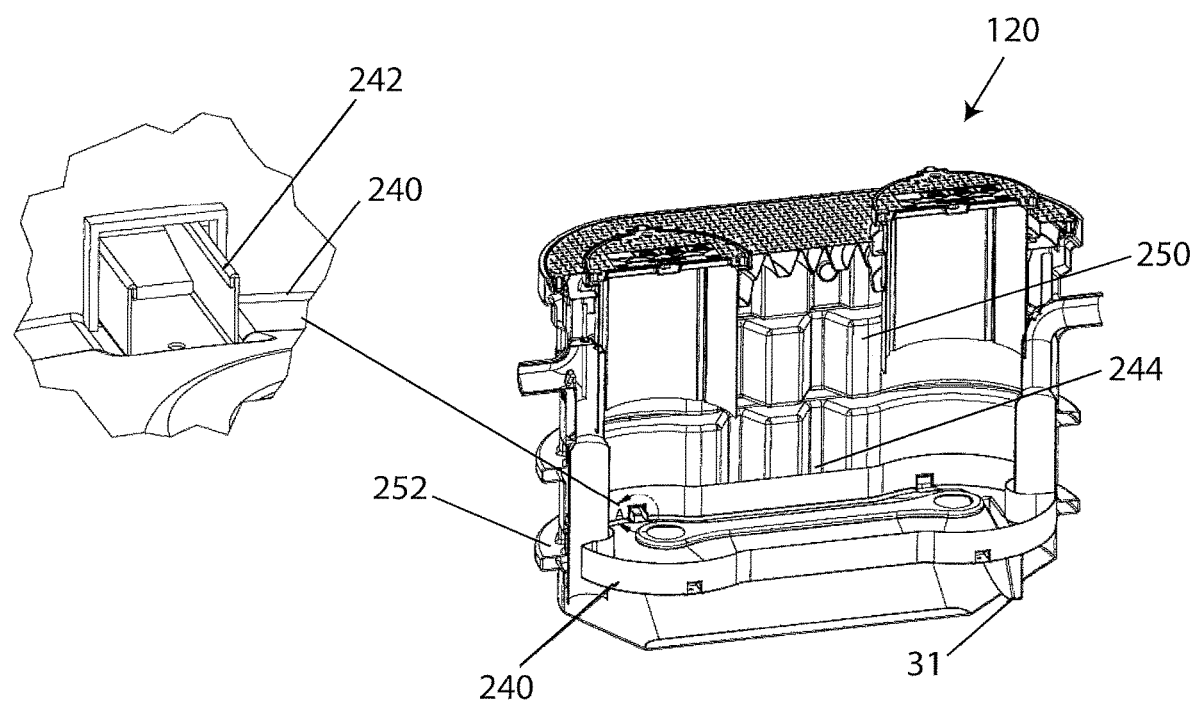
FIG. 14 is a cutaway view of the tank of FIG. 13.

FIGS. 13 and 14 show support ribs 250. Support ribs 250 may extend vertically along the sides of the tank 120. There may be one or more support ribs 250. A set of support ribs 250 may be aligned vertically along the tank 120. Support ribs 250 may be adapted to impart structural stability to tank 120. The support ribs 250 may project inwardly and/or outwardly around the perimeter of the tank 120. Ribs 250 may project outwardly to form the space 244. Space 244 may be formed between and/or adjacent to ribs 250.

Tank 120 may include one or more horizontal rims 252. The one or more horizontal rims 252 may extend along the length L of the tank 120. The bracket 242 may extend into a rim 252 for securing the baffle 240 inside the tank 120. The bracket 242 may be secured to the baffle or to the tank, for example, by bolting, screwing or snapping into place.

The tank 120 may be settled into a support stand 270. Support stand 270 may have a downwardly shaped internal portion adapted to accept and mate to the bottom structure of the tank 120.

In operation, waste water enters the grease tank 10 via the inlet invert 20. The water flows into the diverging space between the upwardly shaped bottom 34 and the downwardly shaped bottom 13. Since the upwardly shaped bottom 34 and the downwardly shaped bottom 13 diverge from the edge of the tank toward the center of the tank, as waste water flows into the diverging area, the velocity of the water flow slows, allowing the grease to rise under the influence of gravity, since it is less dense than the water. Heavy solids sink to the bottom of the downwardly shaped bottom 13. Lightweight greases gather at the upwardly shaped bottom 34 and float through the central outlet port 32 and the passage ways 36 and into the upper tank 24. Since the lightweight greases gather at a location outside of the flow path, less grease is allowed to pass out of the grease tank via the outlet invert 22. The upwardly shaped bottom 15 provides a barrier that sequesters the grease that has become trapped in the tank 12 from the flow of grey water from the inlet 20 to the outlet 22. Thus, the grey water current does not entrain the sequestered grease and sweep it out of the grease trap via the outlet invert 22.

The disclosure also includes methods of separating lightweight grease and heavy solids from waste water including assembling a grease trap having a horizontally positioned, internal, upwardly shaped baffle insert for creating an upper chamber and a lower chamber; passing waste water through the grease tank; allowing residence time in the trap long enough for the solids to settle to a bottom of the lower chamber and grease to rise through openings in the baffle insert into the upper chamber; and pumping out lightweight grease and heavy solids from the two chambers.

A method of separating lightweight grease and heavy solids from wastewater may also include supplying the wastewater into a grease trap through an inlet invert opening into a lower chamber, allowing grey water to exit the grease trap through the lower chamber to an outlet invert, thereby establishing at least intermittent currents from the inlet invert through the lower chamber to the outlet invert; allowing grease in the waste water to rise by gravity from the lower chamber through peripheral passage ways in a baffle and into an upper chamber so the grease is sequestered in the upper chamber and protected from entrainment in the currents of grey water; allowing heavy solids in the waste water to fall by gravity to a downwardly shaped bottom in the lower chamber; and removing collected grease and heavy solids from the grease trap.

Additionally disclosed is a method of making a grease trap including molding a tank having a downwardly shaped bottom; molding an upwardly shaped baffle insert having a hole and passage ways; installing an inlet invert and an outlet invert in the tank; and inserting the upwardly shaped baffle inside the tank to define an upper chamber above the baffle and a lower chamber below the baffle.

Certain modifications and improvements will occur to those skilled in the art upon reading the foregoing description. It should be understood that all such modifications and improvements have been omitted for the sake of conciseness and readability, but are properly within the scope of the following claims.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

What is claimed is:

1. A grease trap for separating waste from waste water comprising:
    a circular shaped tank having a downwardly shaped bottom;
    a circular shaped baffle dividing the tank into an upper chamber and a lower chamber, the baffle having an outlet port for allowing waste to travel from the lower chamber into the upper chamber;
    an inlet invert in the tank for receiving incoming waste water on one side of the tank;
    an outlet invert on an opposite side of the tank from the inlet invert, for removing water from the tank;
    a cover fitting with a top of the tank, the cover including at least a portion serving as a circular port; and
    an extension collar configured to alternate from a first position wherein the extension collar is recessed within the grease trap, to a second position wherein the extension collar extends above the top of the tank and supports the port above the top of the tank.

2. The grease trap according to claim 1 wherein the tank is roto-molded plastic.

3. The grease trap according to claim 1 wherein the baffle is positioned below an inlet invert opening at an inlet connection and an outlet invert opening at an outlet connection.

4. The grease trap according to claim 3 wherein the baffle is a one piece insert to be positioned in the tank above the downwardly shaped bottom.

5. The grease trap according to claim 4 including an upwardly shaped inner portion of the baffle.

6. The grease trap according to claim 5 wherein the upwardly shaped inner portion of the baffle and the downwardly shaped bottom of the tank diverge so waste water entering the lower chambers encounters an enlarging volume.

7. The grease trap according to claim 1 wherein the outlet port is located medially within the baffle.

8. The grease trap according to claim 7 wherein the circular port is located above at least a portion of the cover.

9. The grease trap according to claim 8 wherein the extension collar extends downwardly into the grease trap, a bottom of the extension collar resting below the inlet invert when the extension collar is in the first position.

10. The grease trap according to claim 9 wherein an extension collar walls are substantially parallel to the grease trap walls and the extension collar raises the port into to a different plane than a plane of the top of the grease trap when the extension collar is in the second position.

11. The grease trap according to claim 10 including an accessory collar for extending the port beyond the length of the extension collar.

12. The grease trap according to claim 11 including a twist ladder system for incrementally extending the port above a portion of the top of the tank.

13. The grease trap according to claim 12 including an extension collar gasket for securing the port above the top of the tank.

14. The grease trap according to claim 13 including a tongue and groove system for securing the cover to the top of the tank.

15. A grease trap for separating waste from waste water comprising:
    a tank having a downwardly shaped bottom;
    an inlet invert for directing waste water into the tank;
    an outlet invert for directing water from the tank;
    a baffle insert sectioning the tank into an upper and a lower chamber, the baffle having an upwardly shaped bottom, including a passage way though the baffle such that waste may pass from the lower chamber to the upper chamber and the bottom of the baffle portions the tank into the upper and lower chamber;
    whereby grease and solids may separate from the waste water such that heavy solids fall to the downwardly shaped bottom and grease rises to enter the upper chamber and is sequestered from currents flowing from the inlet invert to the outlet invert, thereby preventing later mixing of sequestered grease into the water exiting the grease tank;
    a cover for covering a top of the grease trap,
    an extension collar tuckable within the tank prior to installation and extendable above the tank when in use, the extension collar supporting the port in an upper plane above a plane of the top of the grease trap when the extension collar is extended.

16. The grease trap according to claim 15 including an accessory collar configured to support the port in a position above the upper plane.

17. The grease trap of claim 15 including at least one rim extending horizontally around the tank.

18. The grease trap of claim 17 wherein the baffle includes a set of bracket slots.

19. The grease trap of claim 18 including a set of brackets that extends through the bracket slots into the rim for securing the baffle within the tank.

20. The grease trap of claim 19 wherein the baffle is a baffle insert.

21. The grease trap of claim 20 wherein the baffle includes a vertical baffle projection.

22. A method of separating lightweight grease and heavy solids from waste water comprising:
    assembling a grease trap having a horizontally positioned internal upwardly shaped baffle insert for creating an upper chamber and a lower chamber;
    raising an extension collar from within the trap to a position above the trap;
    securing the extension collar in an extended position;
    passing waste water through the grease tank;
    allowing residence time in the trap long enough for the solids to settle to a bottom of the lower chamber and grease to rise through openings in the baffle insert into the upper chamber; and
    pumping out lightweight grease and heavy solids from the two chambers.

23. The method according to claim 22 including separating lightweight grease and heavy solids from wastewater comprising
    supplying the wastewater into a grease trap through an inlet invert opening into a lower chamber,
    allowing grey water to exit the grease trap through the lower chamber to an outlet invert, thereby establishing at least intermittent currents from the inlet invert through the lower chamber to the outlet invert;
    allowing grease in the waste water to rise by gravity from the lower chamber through peripheral passage ways in a baffle and into an upper chamber so the grease is sequestered in the upper chamber and protected from entrainment in the currents of grey water;
    allowing heavy solids in the waste water to fall by gravity to a downwardly shaped bottom in the lower chamber; and
    removing collected grease and heavy solids from the grease trap.

* * * * *